United States Patent [19]

Weinstein

[11] Patent Number: 4,943,178
[45] Date of Patent: Jul. 24, 1990

[54] MOUNTING STRUCTURE FOR ROTATING BODIES

[75] Inventor: Richard Weinstein, Toledo, Ohio
[73] Assignee: Illinois Tool Works, Inc., Chicago, Ill.
[21] Appl. No.: 860,928
[22] Filed: May 8, 1986
[51] Int. Cl.[5] .............................................. B05B 5/02
[52] U.S. Cl. ........................................ 403/259; 403/1; 403/282; 403/334; 239/224
[58] Field of Search ............... 403/259, 334, 333, 383, 403/345, 118, 274, 278–279, 282; 411/548; 239/224

[56] References Cited

U.S. PATENT DOCUMENTS

| | | | |
|---|---|---|---|
| 1,056,466 | 3/1913 | Solem | 403/383 |
| 1,407,568 | 2/1922 | Page | 403/333 |
| 1,769,105 | 7/1930 | Bogg | 403/333 |
| 2,518,226 | 8/1950 | Drake | 51/169 |
| 3,827,193 | 8/1974 | Liebmann et al. | 51/169 |
| 3,967,455 | 6/1976 | Conway | 411/548 X |
| 4,423,840 | 1/1984 | Coeling | 239/3 |
| 4,555,058 | 11/1985 | Weinstein et al. | 384/482 |

FOREIGN PATENT DOCUMENTS 2074290  10/1981  United Kingdom ............... 403/345

Primary Examiner—Randolph A. Reese
Assistant Examiner—Franco S. DeLiguori
Attorney, Agent, or Firm—MacMillan, Sobanski & Todd

[57] ABSTRACT

The present invention relates to a mounting structure for securely and accurately positioning an object on a rotatable shaft. In the preferred embodiment, the mounting structure is utilized to position a rotary bell on a rotatable shaft of a rotary atomizer coater. More specifically, the mounting structure includes a rotatable shaft member having an axis and adapted to be connected to a rotating drive mechanism. The shaft member is provided with a first tapered mounting position. An object is adapted to be securely mounted on the shaft member for rotation therewith, and is provided with an internal bore having a second tapered mounting portion engageable with the first tapered mounting portion. The first and second tapered mounting portions cooperate to accurately align the object with respect to the shaft member. In accordance with the present invention, one of the first and second tapered mounting portions includes a plurality of axially spaced apart and generally annular grooves defining tapered land surface portions therebetween. The other one of the first and second tapered mounting portions defines a tapered surface engageable with the tapered land surface portions for securely and accurately positioning the object on the shaft member. In the preferred embodiment of the invention, the grooves are uniformly spaced apart and have a predetermined width which is substantially equal to the width of each of the tapered land surface portions. Also, one of the first and second tapered mounting portions which includes the grooves is formed of a material such as aluminum, while the other one of the first and second tapered mounting portions is formed of a harder material such as steel.

12 Claims, 2 Drawing Sheets

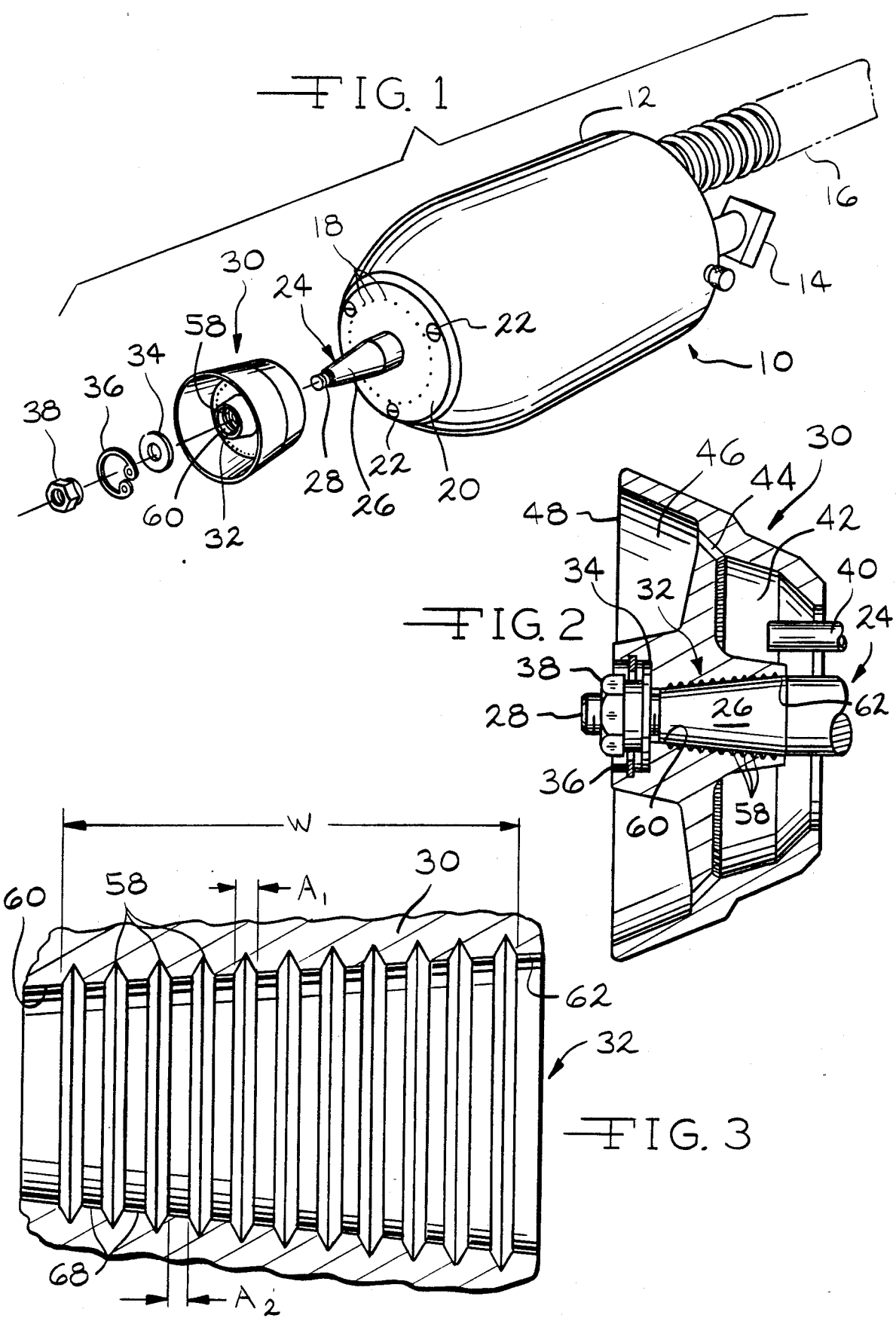

MOUNTING STRUCTURE FOR ROTATING BODIES

BACKGROUND OF THE INVENTION

The present invention relates generally to a mounting arrangement for securely and accurately positioning an object on a rotatable shaft and, in particular, to a tapered surface mounting structure which is especially suitable for mounting high speed rotating bodies. For example, the mounting structure of the present invention can be utilized in a rotary atomizer coater for mounting a rotary bell on an associated rotatable shaft. Examples of such rotary atomizer coaters are disclosed in U.S. Pat. Nos. 4,423,840, and 4,555,058, both of which are commonly owned by the assignee of the present application, and which are hereby incorporated by reference.

In mounting low speed rotary bodies, such as grinding wheels, it is conventional to provide the grinding wheel with a bore hole having a tapered wall which engages a cooperating tapered surface formed on a rotatable shaft in order to securely and accurately position the grinding wheel on the rotatable shaft. Such mounting arrangements are disclosed in U.S. Pat. Nos. 2,518,226 and 3,827,193. In each of these patents, the internal tapered bore of the grinding wheel is provided with a centrally disposed annular recessed portion such that only the spaced apart tapered end portions of the bore contact the cooperating tapered surface on the associated mounting shaft. Such a structure has been found to provide a suitable mounting arrangement for mounting relatively low speed rotary bodies such as grinding wheels, which are typically rotated at the synchronous speed of electric motors such as 1800 rpm or 3600 rpm.

However, in mounting relatively high speed rotary bodies, it is extremely important that the rotating mass be precisely balanced. In order to achieve proper balancing, the rotating body must be securely and precisely positioned relative to the associated rotating shaft. For example, with rotary atomizer coating equipment of the type disclosed in U.S. Pat. Nos. 9,423,840 and 4,555,058, it is extremely important that the rotary bell be precisely positioned on the rotating shaft in order to achieve proper balancing. In rotary atomizer coaters, the rotating shaft typically operates at speeds from 10,000 rpm to above 40,000 rpm and is driven by an air turbine or the like. The importance of proper alignment between the rotary bell and the shaft can be illustrated by way of the following example. For example, in a system with a 0.25 lb. (2.6 kg) object rotating at 40,000 rpm, a misalignment of 0.001 inches (0.03 mm) between the object and the shaft can cause a force of 5.68 lbs (2.6 kg) at the plane of the center of mass of the rotating object. At the very least, this imbalance places a severe strain on the turbine or spindle bearing system.

In the past, in order to achieve precise alignment between the rotary bell and the associated mounting shaft, full mating tapered surfaces have been employed between the shaft and the internal tapered bore of the rotary bell. However, such a mounting arrangement has been found to present several problems. For example, since there is substantially full contact between the male and female tapered surfaces, it has been found extremely difficult to disassemble the rotary bell from the shaft without damage to the bell. This condition is often made worse due to electrolytic corrosion between the tapered surfaces. Also, since due to normal manufacturing tolerances these facing tapered surfaces are not actually in full contact with one another along the entire length of the surfaces, this presents areas wherein the tapered surfaces are spaced apart and, in the case of a rotary atomizer coater, paint infiltration can occur to cause partial bonding between the parts. Further, during assembly, particles of dirt can become entrapped between the facing tapered surfaces to possibly interfere with the alignment of the rotary bell.

SUMMARY OF THE INVENTION

The present invention relates to a unique approach for mounting an object on a rotatable shaft for rotation therewith. In particular, the mounting structure of the present invention is especially advantageous in instances wherein the object must be accurately positioned and aligned with respect to the axis of the shaft, such as when the object and the shaft are to be rotated at relatively high speeds. For example, the present invention has been found to be particularly useful in mounting a rotary atomizer bell of a rotary atomizer coater, since such a bell is typically rotated at speed between 10,000 and 40,000 rpms.

More specifically, the mounting structure of the present invention includes a rotatable shaft which can be a rotatable shaft of a rotary atomizer coater. The shaft member includes an axis and is adapted to be connected to a rotating drive means. Further, the shaft member is provided with a first tapered mounting portion. An object, such as a rotary bell, which is to be securely mounted on the shaft for rotation therewith, is provided with an internal bore having a second tapered mounting portion engageable with the first tapered mounting portion. The second tapered portion cooperates with the first tapered portion to accurately align the object with respect to the shaft member.

In accordance with the present invention, one of the first and second tapered mounting portions includes a plurality of axially spaced apart and generally annular grooves defining tapered land surface portions therebetween. The other one of the first and second tapered mounting portions defines a tapered surface engageable with the tapered land portions for securely and accurately positioning the object on the shaft member. Means can be provided for retaining the object on the shaft member.

As stated above, the plurality of axially spaced apart and generally annular grooves can be provided on either the tapered mounting portion of the shaft member or the tapered mounting portion provided in the internal bore of the object. In the preferred embodiment of the invention, each of the grooves are uniformly spaced apart by a predetermined distance, and the width of each of the grooves is substantially equal to the width of the intervening land surface portions. The grooves can either include individual unconnected grooves, or can cooperate to form a spiral groove.

Further, it has been found desirable to form the one of the tapered mounting portions which includes the grooves of a material which is substantially softer than the material from which the tapered mounting portion having no grooves formed therein is formed. For example, the harder material can be steel and the softer material can be aluminum. It has been found that this enables the tapered mounting portion having the grooves formed therein to be slightly deformed if necessary to provide more positive contact and more accurate alignment with the other cooperating tapered portion.

BRIEF DESCRIPTION OF THE DRAWINGS

The above, as well as other advantages of the present invention, will become readily apparent to one skilled in the art from reading the following detailed description of the preferred embodiment of the invention, in conjunction with the attached drawings, in which:

FIG. 1 is an exploded perspective view of the preferred embodiment of the invention, showing a rotary atomizer electrostatic coater having an atomizer bell which can be secured with the mounting structure of the present invention;

FIG. 2 is a fragmentary sectional view taken along the center line of the atomizer bell shown in FIG. 1 and showing the bell in its assembled position;

FIG. 3 is an enlarged view of the tapered bore of the atomizer bell of FIGS. 1 and 2 which is provided with a plurality of uniformly spaced annular grooves in accordance with the present invention;

DETAILED DESCRIPTION OF THE PREFERRED EMBODIMENT

Figure 4:
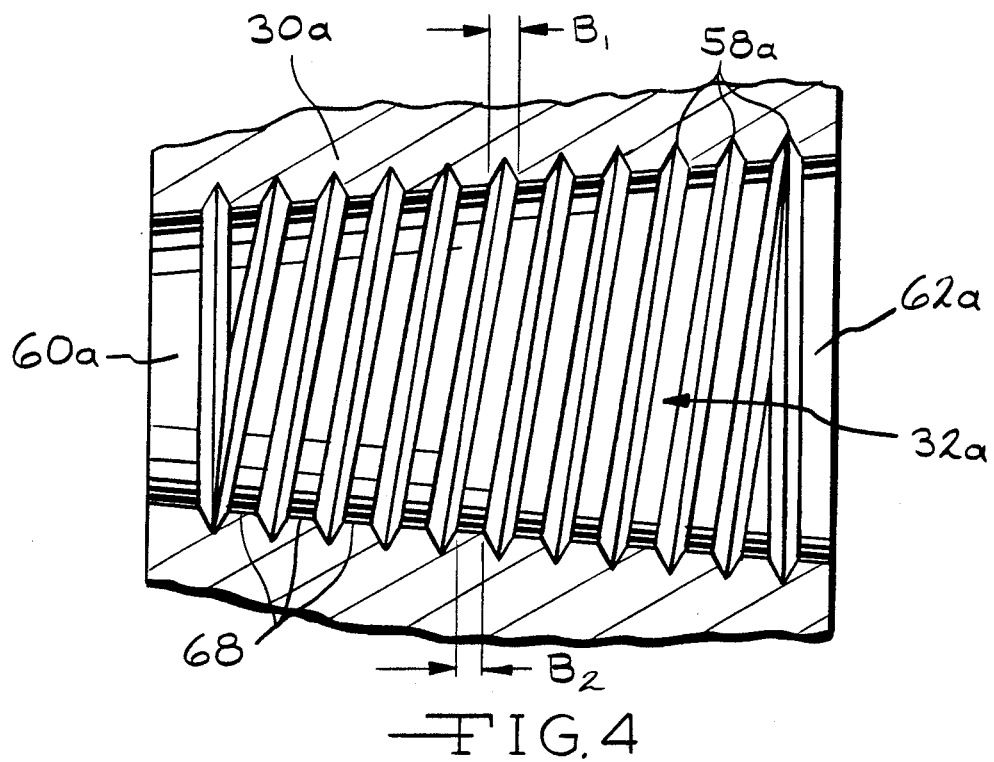
FIG. 4 is an enlarged view illustrating an alternate embodiment of the invention, in which the tapered bore is provided with a helical or spiral groove.

The preferred embodiment of the invention is utilized in a rotary atomizer coater in which a rotary atomizer bell is rotated at high speeds, normally between 10,000 and 40,000 rpm. In a rotary atomizer of this type, paint is delivered to the inner surface of the rapidly rotating bell and thrown off in small particles through centrifugal force. The surface of the bell is charged to a high voltage, normally between 30 kv and 100 kv, to electrostatically charge the paint particles. The atomized charged paint particles are directed at and attracted by an oppositely charged object to coat the object.

Referring now to FIG. 1, there is shown a rotary atomizer coater 10 having an outer housing 12 provided with a non-conductive mounting arm 14 for attachment to a supporting member, such as a robot arm (not shown). A flexible conduit 16 is connected to the rear end of the housing 12 and carries a plurality of paint hoses, air hoses, and an electrical cable. If desired, the paint stream directed from the coater can be shaped by air issuing from a plurality of apertures 18, shown as defining a circular pattern on a front plate 20 which is mounted to the housing 12 by a plurality of screws 22. A rotating shaft 24 extends outwardly through the front plate 20 and is provided with a tapered portion 26 and a threaded portion 28. A rotary atomizer bell 30 includes a cooperating internal tapered portion 32, and is adapted to be secured to the shaft 24 by means of a washer 34, a safety spring clip 36 and a nut member 38.

Turning now to FIG. 2, there is shown a sectional view of an assembled version of the rotary atomizer bell shown in FIG. 1. In such an atomizer bell, paint is delivered through a tube 40 to a first conical surface 42 of the atomizer bell, from which it passes through a plurality of circumferentially spaced apart holes 44 and evenly coats a second conical surface 46. From the second conical surface 46, the paint is moved towards a discharge surface 48, from which it is thrown by centrifugal force. As illustrated, the rotary atomizer bell is retained to the shaft 24 by the washer 34, the safety C-shaped spring clip 36 and the nut member 38.

As illustrated in FIG. 2, the tapered portion 32 of the rotary atomizer bell 30 is provided with a plurality of spaced apart grooves 58. The grooves extend along the junction of tapered portions 26 and 32 from a small terminal end land portion 60 to a large terminal end land portion 62.

Referring now to FIG. 3, it may be seen that, in preferred embodiment of the invention, the spaced apart grooves 58 extend along the bore a distance W and are generally triangular-shaped although, for manufacturing convenience, other shapes may be used. In FIG. 3, the grooves 58 have a width $A_1$ which is substantially equal to the width $A_2$ of intervening land surface portions 68. Thus, the contact area between the rotating object and the mounting shaft along the length W is reduced by approximately 50%. Typically, the tapered shaft portion 26 is constructed of steel, while the tapered rotary bell portion 32 is constructed of a softer material such as aluminum. As will be discussed, this enables the land surface portions 68 to possibly deform on an individual basis during assembly and conform to the contour of the shaft.

Turning now to FIG. 4, there is shown a variation of the embodiment illustrated in FIG. 3. In FIG. 4, an internal tapered portion 32a of a rotary bell 30a includes individual spaced apart grooves 58a which cooperate to define a continuous helical or spiral groove. The individual grooves 58a have a width $B_1$ which is substantially equal to the width $B_2$ of intervening land portions 68a. Terminal end land portions 60a and 62a are provided at the ends of the spiral groove. Although defined by a single groove, the grooves 58a and the land portions 68a function in the same manner, and provide the same advantages, as the separate grooves 58 and the land portions 68 shown in FIG. 3.

Figure 5:
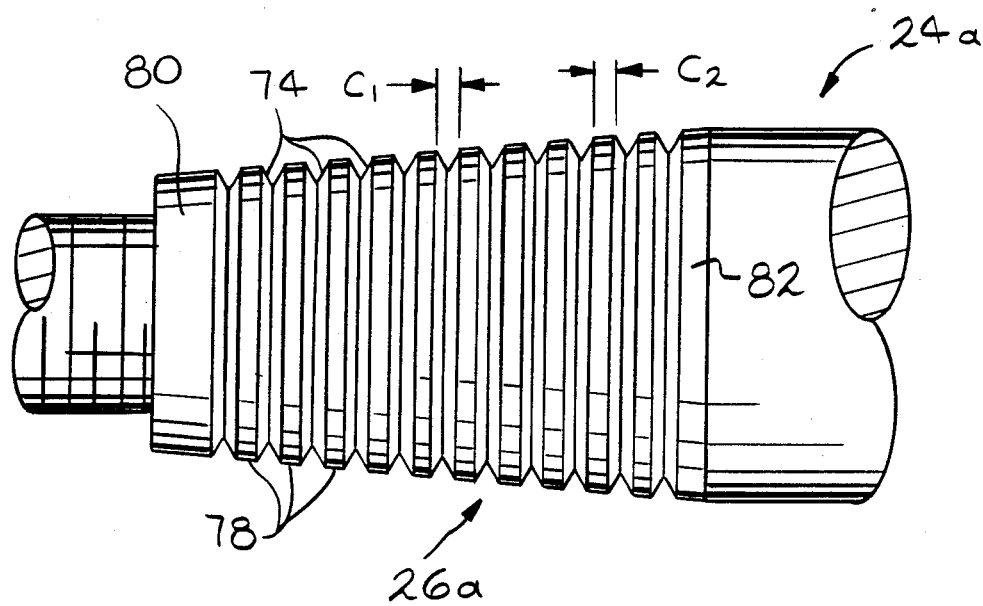
FIG. 5 is an illustration of a further alternate embodiment of the invention, in which the tapered mounting area of a mounting shaft is provided with grooves according to the invention.

There is shown in FIG. 5 a further variation of the invention, wherein the grooves may be provided in the shaft rather than in the internal bore of the rotating object. In FIG. 5, a tapered portion 26a of a shaft 24a includes a plurality of individual grooves 74 having a width $C_1$ and separated by land surface portions 78 having a width $C_2$, which is substantially equal to width $C_1$. While FIG. 5 illustrates the grooves as being formed by separate grooves 74, it will be appreciated that the grooves 74 can cooperate to form a single spiral or helical groove. As illustrated, terminal end land portions 80 and 82 are provided at the ends of the series of grooves 74.

It has been found that the above described mounting structure wherein the potential contact surface in the female tapered portions is reduced by providing a series of uniformly spaced apart grooves enables contact between the male and female members for the full length of the taper and, with only one-half the surface area in actual contact. Thus, the bonding forces normally present are reduced to facilitate disengagement of the female member from the male shaft.

Also, since the force applied to assemble and engage the mating components stays the same, but the contacting surface area between the tapered portions is reduced by half, the force per unit area along the contacting portions is doubled. If the female taper, as in the case of a rotary atomizer bell or disc, is made of aluminum, and the shaft of steel, then the first land surface portions to be placed under pressure can deform to match the shaft taper and permit greater linear engagement across the full length of the tapered portions. Normally, because of small tolerances in the taper angle, only a portion of the surfaces engage in close contact. With the groove design according to the present invention, improvement of alignment is created even if the tolerance is not as close as desired.

Further, if a particle of dirt which could cause a potential misalignment and imbalance was present on the shaft during assembly, there is the opportunity for the particle to move into an adjacent groove as the parts are engaged. If it does not move, with the higher forces involved, the one land surface portion in contact with the dirt particle may be deformed to permit closer engagement of surfaces without affecting the engagement of other portions along the tapered surface.

In addition, doubling the force per unit area acts to exclude corrosive substances or promoters, such as electrolyte and binding agents, from between the contacting areas of the mating tapered portions.

In accordance with the provisions of the patent statutes, the principle and mode of operation of the invention have been explained in its preferred embodiments. However, it must be understood that the invention may be practiced otherwise than as specifically illustrated and described without departing from the spirit or scope of the attached claims.

What is claimed is:

1. A mounting structure for securely and accurately positioning an object on a rotatable shaft comprising:
    a rotatable shaft member having an axis and adapted to be connected to a rotating drive means, said shaft member provided with a first tapered mounting portion;
    an object securely mounted on said shaft member for rotation therewith, said object provided with an internal bore having a second tapered mounting portion engageable with said first tapered portion and cooperating with said first tapered portion to align said object with respect to said shaft member;
    one of said first and second tapered mounting portions including a plurality of axially spaced apart and generally annular grooves defining a plurality of spaced apart tapered land surface portions therebetween, the other one of said firs and second tapered mounting portions defining a tapered surface engageable with said tapered land surface portions for securely and accurately positioning said object on said shaft member;
    said one of said first and second tapered mounting portions including said grooves being formed of a first material, and said other one of said first and second tapered mounting portions being formed of a second material, said second material being substantially harder than said first material such that said tapered mounting portion formed of said first material deforms during assembly of said first and second tapered mounting portions to provide substantial contact and more accurate alignment between said mounting portions.

2. A mounting structure according to claim 1, wherein each of said grooves is formed with a predetermined width and are uniformly spaced apart by a predetermined distance, said predetermined distance defining the width of each of said tapered land surface portions.

3. A mounting structure according to claim 2 wherein said predetermined width and said predetermined distance are substantially equal to one another.

4. A mounting structure according to claim 1 wherein said plurality of generally annular grooves include individual, unconnected grooves.

5. A mounting structure according to claim 1 wherein said plurality of generally annular grooves cooperate to form a spiral groove.

6. A mounting structure according to claim 1 wherein said first material is aluminum and said second material is steel.

7. A mounting structure for securely and accurately positioning a rotary bell on a rotatable shaft of a rotary atomizer coater comprising:
    a rotatable shaft member having an axis and adapted to be connected to a rotating drive means, said shaft member provided with a first tapered mounting portion;
    a rotary bell securely mounted on said shaft member for rotation therewith, said rotary bell provided with an internal bore having a second tapered mounting portion engageable with said firs tapered portion and cooperating with said first tapered portion to accurately align said object with respect to said shaft member;
    one of said first and second tapered mounting portions including a plurality of axially spaced apart and generally annular grooves defining tapered land surfaces portions therebetween, the other one of said first and second tapered mounting portions defining a tapered surface engageable with said tapered land surface portions for securely and accurately positioning said rotary bell on said shaft member;
    said one of said first and second tapered mounting portions including said grooves being formed of a first material, and said other one of said first and second tapered mounting portions being formed of a second material, said second material being substantially harder than said first material such that said tapered mounting portion formed of said first material deforms during assembly of said first and second tapered mounting portions to provide substantial contact and more accurate alignment between said mounting portions; and
    means for retaining said rotary bell on said shaft member.

8. A mounting structure according to claim 7 wherein each of said grooves is formed with a predetermined width and are uniformly spaced apart by a predetermined distance, said predetermined distance defining the width of each of said tapered land surface portions.

9. A mounting structure according to claim 8 wherein said predetermined width and said predetermined distance are substantially equal to one another.

10. A mounting structure according to claim 7 wherein said plurality of generally annular grooves include individual, unconnected grooves.

11. A mounting structure according to claim 7 wherein said plurality of generally annular grooves cooperate to form a spiral groove.

12. A mounting structure according to claim 7 wherein said first material is aluminum and said second material is steel.

* * * * *